Inventor:
Robert Maurer
By: Spencer & Kaye
ATTORNEYS

PUMP CIRCUIT FOR NON-RECIPROCAL AMPLIFIER

Filed Oct. 7, 1963 2 Sheets-Sheet 2

Inventor:
Robert Maurer
By: Spencer & Kaye
ATTORNEYS 3,237,115
PUMP CIRCUIT FOR NON-RECIPROCAL AMPLIFIER Robert M. Maurer, Ulm (Danube), Germany, assignor to Telefunken Patentverwertungs-G.m.b.H., Ulm (Danube), Germany Filed Oct. 7, 1963, Ser. No. 314,357
Claims priority, application Germany, Oct. 5, 1962, T 22,828
10 Claims. (Cl. 330—4.9)

The present invention relates generally to the reactance amplifier art, and, more particularly, to a non-reciprocal reactance amplifier arrangement of an up-converter and a down-converter connected in a cascade arrangement.

Circuits of this type have been proposed wherein the reactance diodes of the two converters or mixers are operated in different phases. There is an idler circuit common to both mixers. In order to neutralize the reactive admittance, i.e., susceptance, of the mixer cascade, a linear, passive, and reciprocal coupling network is connected between the input and output of the cascade arrangement.

It has also been proposed to arrange the idler circuit in such a manner that it has the frequency resonance characteristics which are needed for operation when the frequency is in phase or in the frequency non-inverting case as well as for operation when the frequency is out of phase or in the frequency inverting case. The differently phased feed for the reactance diodes present in the mixer is obtained as follows: the pump generator is directly connected with the first mixer, whereas a phase shifter is interposed between the other mixer and the pump generator.

The main object of the present invention is to provide a reactance amplifier arrangement which is better than those previously proposed and which does not require the undesirably large expense previously needed due to the large pumping energy involved in such arrangements.

Another object of the instant invention is to provide a device of the character described wherein the idler circuit can be a fixedly tuned assembly and only the signal circuits need be tuned.

These objects and others ancillary thereto are accomplished in accordance with preferred embodiments of the invention wherein an improvement of the above-mentioned amplifier arrangement is provided by having the pump generator coupled to the common idler circuit, and the phase shift needed for the pump voltages applied to the reactance diodes of the mixers on the signal side.

Additional objects and advantages of the present invention will become apparent upon consideration of the following description when taken in conjunction with the accompanying drawings in which.

Figure 1:
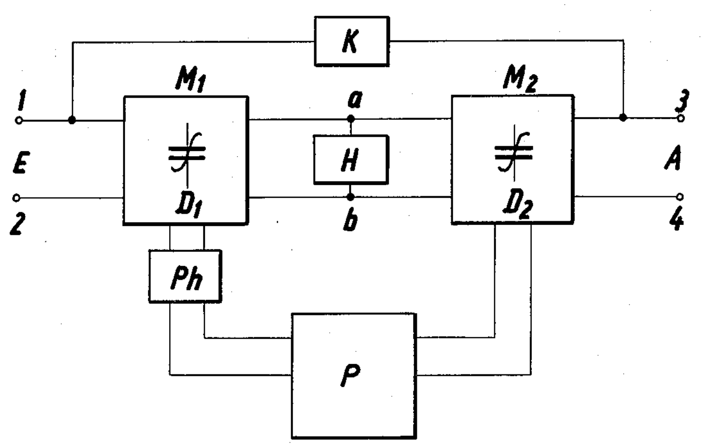
FIGURE 1 is a block diagram of an amplifier arrangement which has been previously proposed.

The above mentioned amplifier arrangement of FIG. 1 is disclosed in the copending application of Löcherer et al., Ser. No. 154,144 and of Maurer et al., Ser. No. 154,-145.

With more particular reference to the drawings, FIGURE 1 shows the previously-proposed non-reciprocal reactance amplifier arrangement. This arrangement comprises an up-converter or step-up mixer $M_1$ and a down-converter or step-down mixer $M_2$ connected in a chain circuit or in cascade fashion. The nonlinear reactances of the two mixers are provided by so-called reactance diodes $D_1$, $D_2$. Each mixer has a signal circuit (not illustrated), and both signal circuits are tuned to the same frequency which is the signal frequency. The idler circuit needed for the two mixers, shown in FIGURE 1 at H, is common to the two mixers. The idler circuit is connected to the circuit at points *a* and *b*. The two reactance diodes are pumped with different phases by means of a pump generator P and a phase shifter P*h*. In order to neutralize the relative admittance, there is provided a linear, passive and reciprocal coupling network K which lies between the input E and the output A of the mixer chain. In the illustrated embodiment, this coupling network is connected with the input terminal and the output terminal 3. The remaining terminals are shown at 2 and 4.

It has been proposed, in the circuit of FIGURE 1, to fashion the idler circuit H in such a manner that it has the frequency resonance characteristics which are needed for operation when the frequency is in phase and for operation when the frequency is in inverse phase position.

The circuit of the present invention differs from the above-described arrangement in that the pump generator is coupled to the common idler circuit and that the phase shift for the pump voltages applied to the two reactance diodes is effected, via a pump circuit, on the signal side of the amplifier arrangement.

Figure 2:
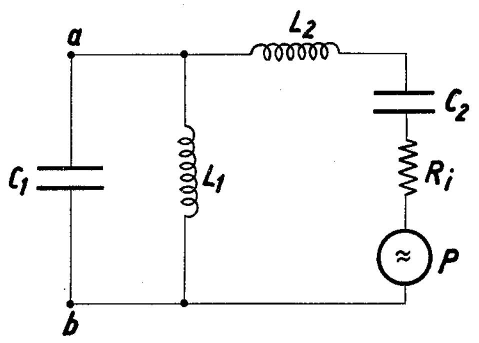
FIGURE 2 is a circuit diagram of an idler circuit with a pump generator and a pump circuit connected thereto.

The common idler circuit is, therefore, arranged as shown in FIGURE 2, in which the idler circuit comprises an inductor $L_1$ connected in parallel with a capacitor $C_1$. Also connected in parallel is the series circuit made up of a second inductor $L_2$, a second capacitor $C_2$, and the pump generator P whose internal resistance is indicated at $R_i$. The two connection points *a* and *b* correspond to the points at which the idler circuit H of FIGURE 1 is connected. While keeping the auxiliary frequencies $p \pm s$ ($p$=pump frequency, $s$=signal frequency) across the terminals *a* and *b*, both circuits can be tuned to the pump frequency $p$. As a result, the pump generator, at the pump frequency, lies directly across the terminals *a* and *b* and the diodes are controlled or operated maximally.

Figure 3:
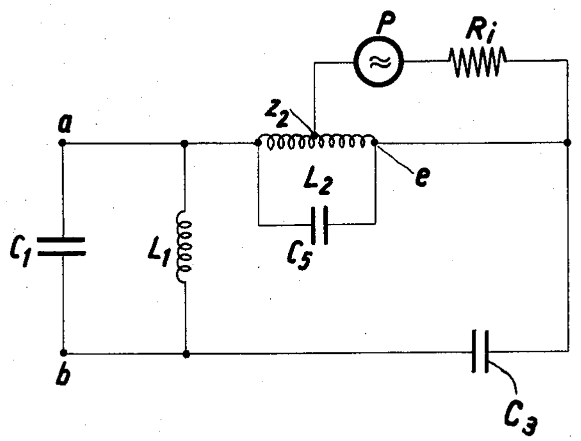
FIGURE 3 is a circuit diagram of an idler circuit with a pump generator and a pump circuit connected thereto in a different manner than that of FIGURE 2.

As is well known, the reactance amplifier requires a high pump work output or large pumping energy which entails undesired large expense. This disadvantage can by avoided by the provision of a special idler circuit as shown in FIGURE 3, with which the pump voltage can be transformed. In this embodiment, the idler circuit with its two terminal points *a* and *b* again comprises a capacitor $C_1$ and an inductor $L_1$. While in the circuit according to FIGURE 2 the series circuit of an inductor $L_2$, a capacitor $C_2$, and the internal resistance $R_i$ of the pump generator are in parallel with the terminals *a*, *b*, the common idler circuit of FIGURE 3 incorporates a capacitor $C_5$ which is connected in parallel with the second inductor $L_2$. This second inductor $L_2$ has a tap $z_2$. The internal resistance $R_i$ of the pump generator is here coupled between this tap $z_2$ and the end $e$ of the inductor $L_2$. A capacitor $C_3$ lies between the point at which the pump generator is connected to the end $e$ of the inductor and the terminal *b* of the idler circuit. Such a circuit arrangement makes it possible to transform the pump voltage. The parallel circuits ($C_1$, $L_1$ and $C_5$, $L_2$) are tuned to the pump frequency $f_p$. The two circuits are coupled supercritically by means of the capacitor $C_3$ so that a minimum of pump voltage is sufficient to produce the desired effect.

The reactive admittance of the mixer chain is neutralized by means of the coupling network K. To this end, an inductive or capacitative reactive admittance can be used. If, in the simplest case, the neutralization is accomplished by means of a capacitor, it is recommended that the necessary phase shifting of the pump voltage, which is done on the signal side, is effected by means of a pump circuit which is connected to the input E of the circuit.

Figure 4:
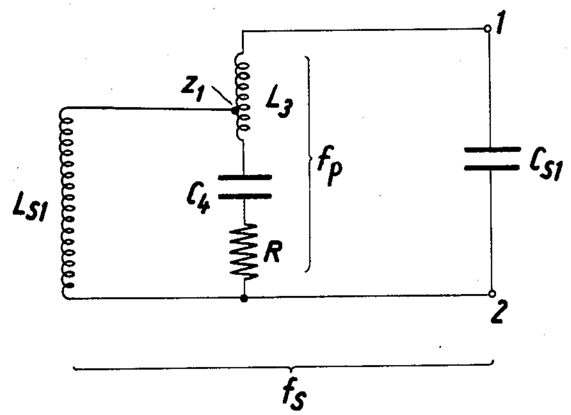
FIGURE 4 is a circuit diagram of a signal circuit.

FIGURE 4 shows a signal circuit on the input side of the amplifier arrangement. By means of this signal circuit the desired phase shifting is accomplished. The signal circuit comprises the parts $L_{S1}$, $L_3$, $C_4$, R and $C_{S1}$. The terminals 1 and 2 in FIGURE 4 correspond to the input terminals 1, 2, of FIGURE 1. The circuit is so designed that the entire circuit connected across terminals 1, 2, is tuned to the signal frequency $f_s$. The capacitor $C_{S1}$ is in parallel with the terminals 1, 2, as is a series circuit constituted by the inductor $L_3$, the capacitor $C_4$, and the resistor R. This series circuit is arranged as a pump circuit and is therefore tuned to the pump frequency $f_p$. The components $C_{S1}$, $L_3$, $C_4$ and R represent a $\pi$-network. The pump voltage therefore has a voltage node at one point of this circuit, namely, at the tap $z_1$ of the inductor $L_3$. Therefore, an inductance $L_{S1}$ is connected between this nodal point and the terminal 2 so that, if possible, no pump voltage appears across the input terminals. According to the present invention, the individual circuit components of the circuit of FIGURE 4 are so designed, i.e., have such values that, without appreciable influence on the signal voltage, the pump voltage for the one capacitance diode ($D_1$) of the one mixer is phase-shifted by 90° with respect to the pump voltage applied to the capacitance diode ($D_2$) of the other mixer, and that the same pump voltages applied to the diodes are of the same amplitude. A simple adjustment for the circuit is provided by varying the resistance R.

According to a further feature of the present invention, the idler circuit common to the mixers is so designed or dimensioned as to have substantially no reactive components throughout the band over which the amplifier arrangement is to be tuned. This result can be achieved by letting the idler circuit have the frequency pass-band characteristic of a band-pass filter with slight overcritical coupling, the two humps of the pass-band curve  being the sum and difference frequencies, respectively, obtained from the pump and signal frequencies. With such an idler circuit, it becomes possible to tune the amplifier arrangement in such a manner that only the signal circuits need be tuned, while the idler circuit may remain constant and can thus be built into the amplifier arrangement as a fixedly tuned component. This distance frequency-wise of the hump frequencies of the idler circuit is equal to the maximally double signal frequency; the tuning then always represents a lessening of the signal frequency.

It will be understood that the above description of the present invention is susceptible to various changes, modifications, and adaptations, and the same are intended to be comprehended within the meaning and range of equivalents of the appended claims.

What is claimed is:

1. A non-reciprocal reactance amplifier device, comprising, in combination:
   an up-converter and a down-converter connected in a cascade arrangement which has an input and an output, said converters having reactance diodes;
   an idler circuit common to both converters and having the frequency resonance characteristics necessary for operation in the frequency non-inverting case as well as for operation in the frequency inverting case;
   a linear, passive and reciprocal coupling network connected between the input and the output of the cascade connected converters; and
   means for feeding out of phase pump voltages to said converters to pump said reactance diodes in different phases, said feeding means including a pump generator coupled to said idler circuit, and a pump circuit connected to said input for providing, on the signal side of the device, the phase shifting necessary for the pump voltages applied to the two reactance diodes.

2. A device as defined in claim 1 wherein said idler circuit includes the parallel connection of:
   (a) a first inductor,
   (b) a first capacitor, and
   (c) a series circuit of at least a portion of a second inductor, a second capacitor, and said pump generator including its internal resistance.

3. A device as defined in claim 2 wherein a third capacitor is connected with said second inductor, and the internal resistance of the pump generator is connected between a tap on said second inductor and one end of said second inductor.

4. A non-reciprocal reactance amplifier device, comprising, in combination:
   an up-converter and a down-converter connected in a cascade arrangement having an input and an output and including reactance diodes;
   an idler circuit common to both converters and having the frequency resonance characteristics necessary for operation in the frequency non-inverting case as well as for operation in the inverting case;
   a linear, passive and reciprocal coupling network in the form of a capacitor connected between the input and the output of the cascade connected converters; and
   means for feeding out of phase pumping voltages to said converters to pump said reactance diodes in different phases, said feeding means including a pump generator coupled to said idler circuit and a pump circuit connected to said input for providing, on the signal side of the device, the phase shifting necessary for the pump voltages applied to the two reactance diodes.

5. A device as defined in claim 4 comprising a signal circuit connected to the input side of the cascade arrangement and constituted in part by a series circuit including an inductor tuned to the pump frequency and which is the pump circuit, a signal circuit capacitor connected in parallel with said series circuit and a signal circuit inductor connected to a tap of the inductor of the pump circuit at a location where the pump voltage at the tap has a voltage node, the elements being arranged to provide that the pump voltages applied to the diodes of the converters are phase-shifted by 90° with respect to each other and are of the same amplitude.

6. A device as defined in claim 5 wherein said diodes are capacitance diodes.

7. A nonreciprocal reactance amplifier device, comprising, in combination:
   an up-converter and a down-converter connected in a cascade arrangement which has an input and an output, said converters having reactance diodes;
   an idler circuit common to both converters and having the frequency resonance characteristics necessary for operation in the frequency non-inverting case as well as for operation in the frequency inverting case and arranged to have substantially no reactive components in the frequency band throughout which the amplifier device is to be tuned;
   a linear, passive and reciprocal coupling network connected between the input and the output of the cascade connected converters; and
   means for feeding out of phase pump voltages to said converters to pump said reactance diodes in different phases, said feeding means including a pump generator coupled to said idler circuit, and a pump circuit connected to said input for providing, on the signal side of the device, the phase shifting necessary for the pump voltages applied to the two reactance diodes.

8. A device as defined in claim 7 wherein said idler circuit has a band-pass characteristic which is approximately the same as that of a band filter with slight supercritical coupling.

9. In a non-reciprocal reactance amplifier device including an up-converter and a down-converter connected in a cascade arrangement which has an input and an output, the converters having reactance diodes, an idler circuit common to both converters and having the frequency resonance characteristics necessary for operation in the frequency non-inverting case as well as for operation in the inverting case, a linear, passive and reciprocal coupling network connected between the input and the output of the cascade connected converters, the improvement comprising: means for feeding out of phase pump voltages to said converters to pump said reactance diodes in different phases, said feeding means including a pump generator coupled to said idler circuit and a pump circuit connected to said input for providing, on the signal side of the device, the phase shifting necessary for the pump voltages applied to the two reactance diodes.

10. In a non-reciprocal reactance amplifier arrangement, including a step-up mixer and a step-down mixer in a chain circuit connection, the reactance diodes of which mixers are pumped with different phases, there being an idler circuit common to both mixers and there being, for purposes of neutralizing the reactive admittance of the mixer chain, a linear, passive and reciprocal coupling network connected between the input and output of the chain, and in which the common idler circuit is so arranged as to have the frequency resonance characteristics necessary for operation with the same frequency position as well as for operation with inverted frequency position, the improvement wherein a pump generator is coupled to the common idler circuit and the phase shifting which is necessary for the pump voltages applied to the two reactance diodes is effected on the signal side by means of a pump circuit.

No references cited.

ROY LAKE, *Primary Examiner.*